(12) United States Patent
Chang et al.

(10) Patent No.: US 8,787,051 B2
(45) Date of Patent: Jul. 22, 2014

(54) METHOD AND APPARATUS FOR CONTROLLING THE EQUIVALENT RESISTANCE OF A CONVERTER

(71) Applicant: Macroblock, Inc., Hsinchu (TW)

(72) Inventors: Lon-Kou Chang, Hsinchu (TW);
Yi-Wen Huang, Hsinchu (TW);
Han-Hsiang Huang, Hsinchu (TW)

(73) Assignee: Macroblock, Inc., Hsinchu (TW)

( * ) Notice: Subject to any disclaimer, the term of this patent is extended or adjusted under 35 U.S.C. 154(b) by 55 days.

(21) Appl. No.: 13/720,300

(22) Filed: Dec. 19, 2012

(65) Prior Publication Data

US 2013/0170259 A1    Jul. 4, 2013

(30) Foreign Application Priority Data

Dec. 30, 2011 (TW) .............................. 100149917 A (51) Int. Cl.
*H02M 5/42* (2006.01)

(52) U.S. Cl.
USPC .............................................................. 363/84

(58) Field of Classification Search
USPC ................. 363/78, 79, 81, 84, 89, 123, 125
See application file for complete search history.

(56) References Cited

U.S. PATENT DOCUMENTS

| | | | | |
|---|---|---|---|---|
| 6,597,588 B2 * | 7/2003 | Matsumoto | ................ | 363/21.08 |
| 6,654,264 B2 * | 11/2003 | Rose | ................ | 363/65 |
| 6,674,274 B2 * | 1/2004 | Hobrecht et al. | ............. | 323/285 |
| 6,819,226 B2 * | 11/2004 | Randall | ......................... | 340/333 |
| 6,836,417 B2 * | 12/2004 | Hiraki et al. | .................. | 323/268 |
| 6,903,537 B2 * | 6/2005 | Tzeng et al. | .................... | 323/268 |
| 7,005,835 B2 * | 2/2006 | Brooks et al. | .................. | 323/282 |
| 7,046,529 B2 * | 5/2006 | Chang | .............................. | 363/44 |
| 7,109,691 B2 * | 9/2006 | Brooks et al. | ................. | 323/282 |
| 7,199,561 B2 * | 4/2007 | Noma | ............................ | 323/224 |
| 7,215,102 B2 * | 5/2007 | Harris et al. | .................... | 323/268 |
| 7,279,665 B2 * | 10/2007 | Kagan | .......................... | 219/661 |
| 7,301,313 B1 * | 11/2007 | Hart et al. | ...................... | 323/269 |
| 7,626,838 B2 * | 12/2009 | Gunji | ........................ | 363/56.04 |
| RE41,270 E * | 4/2010 | Hiraki et al. | .................. | 323/268 |
| 7,791,912 B2 * | 9/2010 | Walde | ........................ | 363/56.04 |
| 7,795,915 B2 * | 9/2010 | Candage et al. | ................ | 326/59 |
| 8,022,726 B2 * | 9/2011 | Candage et al. | ................ | 326/59 |
| 8,067,926 B2 * | 11/2011 | Carmen | ........................ | 323/282 |
| 8,284,570 B2 * | 10/2012 | Zhu et al. | .................... | 363/21.02 |
| 8,385,092 B1 * | 2/2013 | Shekhawat | ................. | 363/56.04 |
| 8,547,714 B2 * | 10/2013 | Higuchi | ..................... | 363/56.04 |
| 8,575,902 B1 * | 11/2013 | Wei et al. | ...................... | 323/269 |
| 8,624,567 B2 * | 1/2014 | Popescu | ........................ | 323/267 |

* cited by examiner

*Primary Examiner* — Adolf Berhane
(74) *Attorney, Agent, or Firm* — Morris Manning & Martin LLP; Tim Tingkang Xia, Esq.

(57) ABSTRACT

The disclosure provides a method for controlling an equivalent resistance of a converter. The method includes receiving a power source input signal, generating a first control signal according to a voltage level and a state of the power source input signal to adjust an equivalent resistance of the voltage conversion module and cause the voltage conversion module to operate in the damper mode or the converter mode, when the voltage conversion module operates in the converter mode converting the power source input signal to an output signal, and when the voltage conversion module operates in the damper mode detecting the voltage level or the current level of the power source input signal, and adjusting the equivalent resistance so that the voltage conversion module could operate in the bleeder mode or the converter mode to convert the power source input signal to the output signal.

12 Claims, 6 Drawing Sheets

METHOD AND APPARATUS FOR CONTROLLING THE EQUIVALENT RESISTANCE OF A CONVERTER

CROSS REFERENCE TO RELATED APPLICATIONS

This non-provisional application claims priority under 35 U.S.C. §119(a) on Patent Application No(s). 100149917 filed in Taiwan, R.O.C. on Dec. 30, 2011, the entire contents of which are hereby incorporated by reference.

TECHNICAL FIELD

The disclosure relates to equivalent resistance control technology, and more particularly to a method and an apparatus for controlling an equivalent resistance of a converter.

BACKGROUND

Generally, the architecture including Triode AC semiconductor switch (TRIAC) and power factor calibrator (PFC) is used to perform a dimming operation on lamps, light emitting diodes, or other lighting modules. In order to make the TRIAC work even at a small conduction angle, the architecture further includes a bleeder. As such, a holding current required by the TRIAC may be maintained to prevent cut-off phenomenon of the TRIAC.

Furthermore, during the dimming operation, an input signal may have a short surge vibration, and thus the architecture is also required to include a damper and a control circuit to prevent the short surge vibration. Therefore, the manufacturing cost associated with the entire circuitry may increase due to the additional bleeder and damper. The increased manufacturing cost aside, using the resistance damper for limiting the occurrence of the short surge vibration will cause extra energy loss.

SUMMARY

In one aspect, a method for controlling an equivalent resistance of a converter is adapted to an apparatus having a voltage conversion module for controlling the equivalent resistance of the converter. And the method includes receiving a power source input signal, generating a first control signal according to the voltage level and the state of the power source input signal to adjust an equivalent resistance of the voltage conversion module and cause the voltage conversion module to operate at the damper mode or the converter mode, and converting the power source input signal to an output signal when the voltage conversion module operates in the converter mode. The method further includes when the voltage conversion module operates in the damper mode adjusting the equivalent resistance of the voltage conversion module according to the second control signal and the required holding current of dimmer, allowing for the voltage conversion module to operate either in the bleeder mode or the converter mode.

In another aspect, an apparatus for controlling an equivalent resistance of a converter includes a control module for receiving a power source input signal, generating a first control signal according to the voltage level and the state of the power source input signal, and generating a second control signal according to the voltage level or the current level of the power source input signal, and a voltage conversion module connected to the control module for controlling the equivalent resistance of the voltage conversion module according to the first control signal to render the voltage conversion module to operate in the damper mode or the converter mode. If the voltage conversion module operates in the converter mode, the power source input signal will be converted to an output signal. If the voltage conversion module operates in the damper mode, the equivalent resistance of the voltage conversion module is adjusted according to the second control signal and the required holding current of dimmer, which allow for the voltage conversion module to operate in the bleeder mode or the converter mode.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

Figure 1:
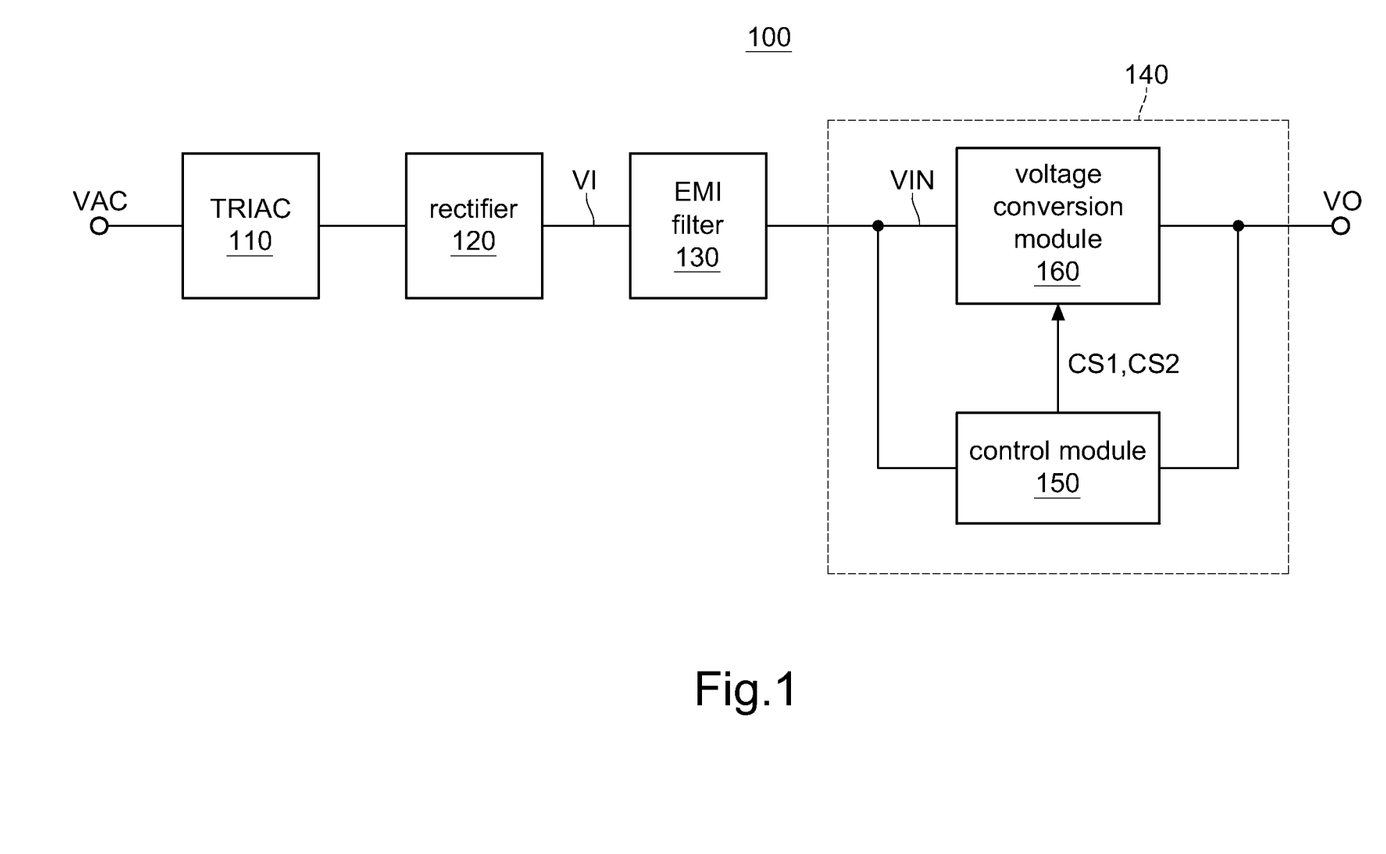
FIG. 1 is a block diagram for a load driving circuit according to one embodiment of the present disclosure.

FIG. 1 is a block diagram for a load driving circuit according to one embodiment of the present disclosure. The load driving circuit 100 includes a TRIAC 110, a rectifier 120, an electromagnetic interface (EMI) filter 130, and an apparatus 140 for controlling the equivalent resistance of a convertor. In this embodiment, the TRIAC 110 may be adapted to perform a dimming operation on a lighting module (for example, light emitting diodes or lamps, not shown in FIG. 1) driven by the load driving circuit 100. In another embodiment, the TRIAC 110 can be omitted in the load driving circuit 100. That is, the alternating current (AC) signal VAC is directly inputted to the rectifier 120.

The rectifier 120 may be connected to the TRIAC 110. The AC signal VAC, which may be processed by the TRIAC 110 and the rectifier 120, may cause the generation of a rectified signal VI. The rectifier 120 may be but not limited to a bridge rectifier. The EMI filter 130 connected to the rectifier 120 may be used to filter the rectified signal VI and generate a power source input signal VIN.

The apparatus 140 for controlling the equivalent resistance of a convertor may include a control module 150 and a voltage conversion module 160. The control module 150 may be used to receive the power source input signal VIN to generate a control signal CS1 according to the voltage level and the state of the power source input signal VIN and generate anther control signal CS2 according to the voltage level or the current level of the signal VIN.

The voltage conversion module 160 connected to the control module 150 may be used to adjust the equivalent resistance of the voltage conversion module 160 according to the control signal CS1 so that the voltage conversion module 160 could therefore operate in the damper mode or the converter mode. When the voltage conversion module 160 operates in the converter mode, the voltage conversion module 160 converts the power source input signal VIN to an output signal VO.

When operating at the damper mode, the voltage conversion module 160 adjusts its own equivalent resistance according to the control signal CS2 and the required holding current of dimmer, so that the voltage conversion module 160 may operate in the bleeder mode or the converter mode. In this way, the apparatus 140 may serve as an active damper, a bleeder, or a converter by having the equivalent resistance of the voltage conversion module 160 adjusted, without other passive dampers and bleeders. Therefore, the manufacturing cost of the entire circuitry can be reduced effectively.

In this embodiment, the control module 150 may firstly detect whether the voltage level of the power source input signal VIN is greater than zero, which is indicative of whether the load driving circuit 100 is at work. Then, the control module 150 detects whether the power source input signal VIN is in a vibrating state or a jumping state. And if the power source input signal VIN is not in the vibrating state or the jumping state the control module 150 generates, for example, a control signal CS1 in "high" logic level to control the voltage conversion module 160 to operate in the converter mode and thus convert the power source input signal VIN to the output signal VO. In this way, the load driving circuit 100 does not include the TRIAC 110. That is, the apparatus 140 is not used together with a silicon-controlled power dimmer.

On the other hand, if the control module 150 detects that the power source input signal VIN is in the vibrating state or the jumping state, the control module 150 generates, for example, a control signal CS1 in "low" logic level to adjust the equivalent resistance of the voltage conversion module 160 to cause the voltage conversion module 160 to operate in the damper mode. That is, the voltage conversion module 160 functions as a damper. In this way, the load driving circuit 100 includes the TRIAC 110, i.e., the apparatus 140 is used together with a silicon-controlled power dimmer.

Figure 2:
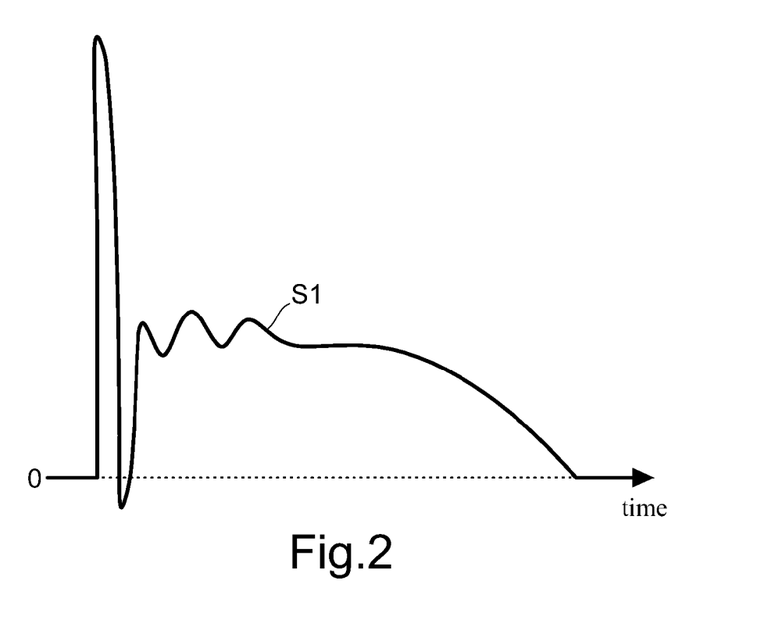
FIG. 2 is a wave form of a power source input signal according to one embodiment of the present disclosure.

For example, when the TRIAC 110 operates the power source input signal VIN filtered by the EMI filter 130 may be associated with the ringing effect due to the EMI filter 130. The ringing effect may cause the power source input signal VIN to vibrate or swing upwardly and downwardly, as shown in FIG. 2. In FIG. 2, the curve S1 shows the current wave form of the power source input signal VIN. The control module 150 adjusts the equivalent resistance of the voltage conversion module 160 cause the voltage conversion module 160 to function as a damper, effectively prevent the vibration of the power source input signal VIN. Since the voltage conversion module 160 may serve as a damper, the additional energy consumption associated with the installation of the additional damper can be reduced.

Then, the control module 150 further detects whether the voltage level or the current level of the power source input signal VIN is lower than a default value so as to control the voltage conversion module 160 to operate in the bleeder mode or the converter mode. If the voltage level or the current level of the power source input signal VIN is lower than the default value, the control module 150 generates, for example, a control signal CS2 in low logic level to adjust the equivalent resistance of the voltage conversion module 160 to cause the voltage conversion module 160 to operate in the bleeder mode. For example, the current of the power source input signal VIN is greater than or equal to the holding current of the TRIAC 110. As such, the voltage conversion module plays a role as a bleeder.

After the voltage conversion module 160 operates in the bleeder mode, the control module 150 detects again whether the power source input signal VIN is in a vibrating state or a jumping state at the beginning of each power source period, and thus determine whether to switch the operation mode (i.e., damper mode, bleeder mode, or converter mode) of the voltage conversion module 160 for subsequent conversion operations on the power source input signal VIN.

If the voltage level or the current level of the power source signal VIN is detected to be higher than the default value, the control module 150 generates, for example, a control signal CS2 in "high" logic level to adjust the equivalent resistance of the voltage conversion module 160, in order to enable the voltage conversion module 160 to operate in the converter mode so that the power source input signal VIN is converted to be the output signal VO. It is worth noting that the current of the power source input signal VIN is usually greater than the holding current of the TRIAC 110. In this way, the voltage conversion module 160 may serve as a converter for subsequent operations.

After the voltage conversion module 160 operates in the converter mode, the control module 150 detects again whether the power source input signal VIN is in the vibrating state or the jumping state at the beginning of each power source period, and thus switches the operation mode (i.e., damper mode, bleeder mode, or converter mode) of the voltage conversion module 160 for subsequent conversion operations on the power source input signal VIN.

As described above, the embodiment may determine whether the voltage conversion module 160 operates in a single mode (i.e., converter mode) or three modes (i.e., damper mode, bleeder mode, and converter mode) based on the detection of whether the power source input signal is in the vibrating state or the jumping state (i.e., state of the power source input signal VIN).

Figure 3:
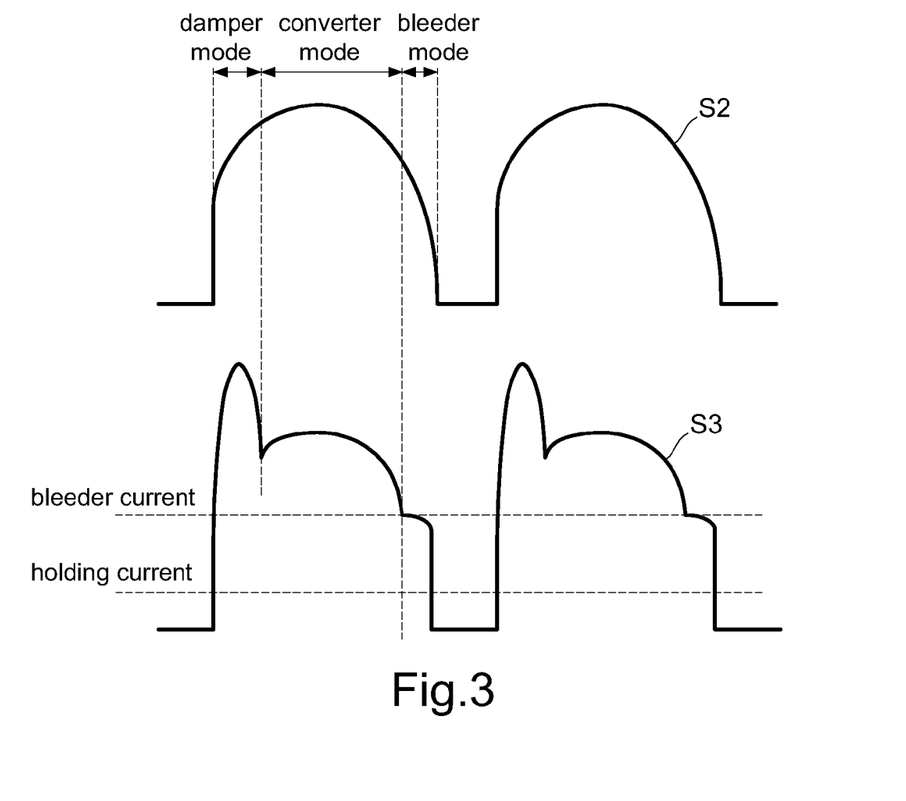
FIG. 3 is shows a voltage wave form and a current wave form for the power source input signal when the voltage conversion module operates in the damper mode, bleeder mode, and converter mode according to one embodiment of the present disclosure.

FIG. 3 shows a voltage wave form and a current wave form for the power source input signal when the voltage conversion module 160 operates in the damper mode, bleeder mode, and converter mode. The curve S2 in FIG. 3 is the voltage wave form for the power source input signal VIN, and the curve S3 in FIG. 3 is the current wave form for the same power source input signal VIN. As shown in FIG. 3, when the voltage conversion module 160 operates in the bleeder mode, the current of the power source input signal VIN is maintained at the level that is equal to that of the bleeder current and greater than the holding current. When the voltage conversion module 160 operates in the converter mode, the current of the power source input signal VIN is always greater than the holding current. In such a way, the cut-off effect of the TRIAC 110 may be prevented. In addition, the duration of the voltage conversion module 160 operating in the damper mode may last in one implementation, for example, ½ the resonant period of the EMI filter 130.

In this embodiment, the power source input signal VIN includes an input voltage and an input current. The output signal VO includes a quantitative voltage and a quantitative current.

In addition, the voltage conversion module 160 may be but not limited to a buck-boost converter, a power factor correction resonance converter, a buck converter, a boost converter, or a fly-back converter.

The following example is illustrated for persons skilled in the art to better understand how the control module 150 controls the voltage conversion module 160 to adjust its equivalent resistance and causes the voltage conversion module 160 to operate in the corresponding operation mode. It is assumed that the voltage conversion module 160 is a power factor correction resonance converter. The power factor correction resonance converter is also referred to as a power factor correction LC-LC converter.

Figure 4:
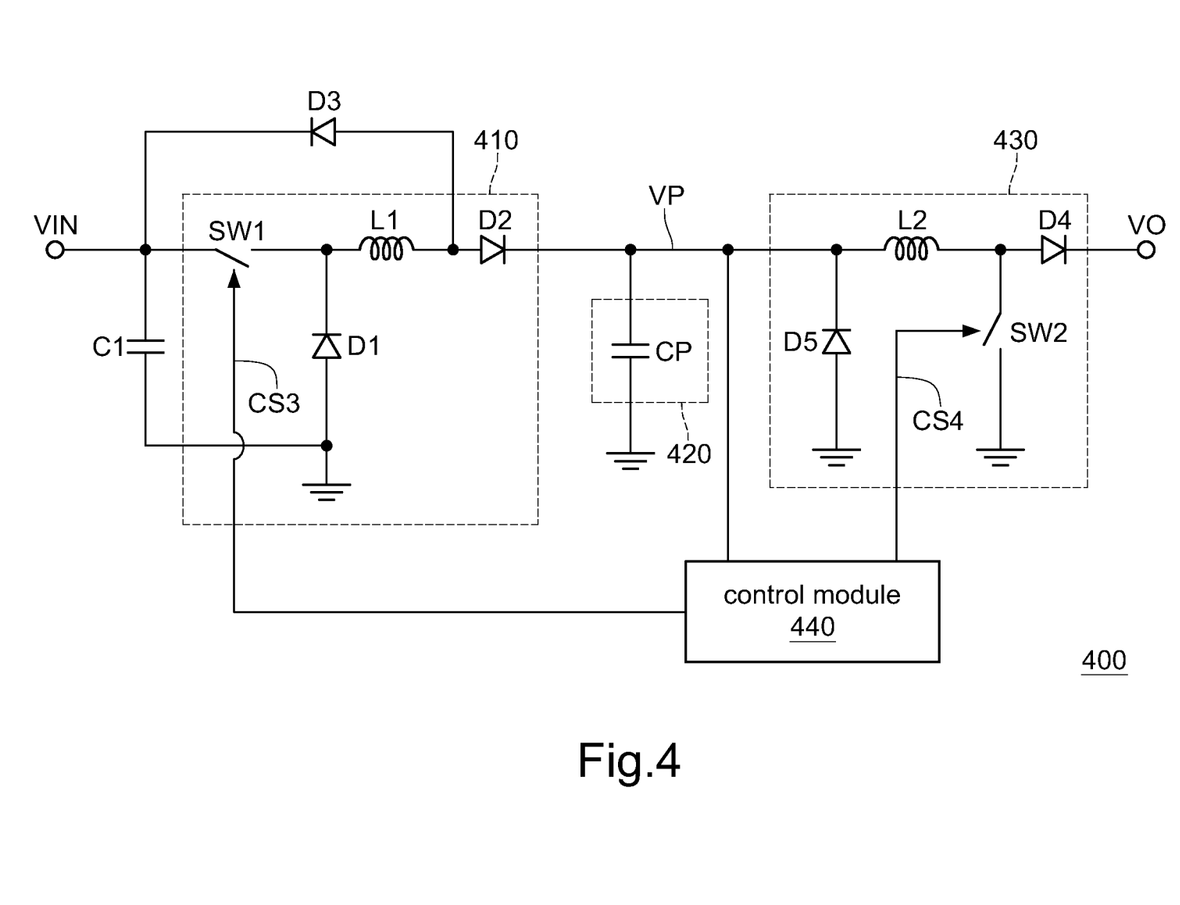
FIG. 4 is a diagram for a power factor correction resonance converter according to one embodiment of the present disclosure.

FIG. 4 is a diagram for a power factor correction resonance converter. The power factor correction resonance converter (i.e., the voltage conversion module 160) includes a power-obtaining circuit 410, an energy-storage component 420, an energy-transferred circuit 430, a diode D3, a capacitor C1, and a control unit 440. The connectional relationship of these elements can be referred to in FIG. 3 and will not be described herein again. The power-obtaining circuit 410 includes a switch SW1, diodes D1 and D2, and an inductor L1. The connectional relationship of these elements can be referred to in FIG. 4 and will not be described herein again. The switch SW1 is controlled by a control signal CS3.

In this embodiment, the energy-storage component 420 may include a capacitor CP. The energy-transferred circuit 430 includes an inductor L2, a switch SW2, and diodes D3 and D5. The connectional relationship of these elements can be referred to in FIG. 4 and will not be described herein again. The switch SW2 is controlled by a control signal CS4. In this embodiment, the transfer of the energy can be realized by having the capacitor CP being charged and discharged. Charges accumulated in the capacitor CP is represented by the following equation:

$$\Delta Q = I \times \Delta t = C_p \times \Delta V \quad (1)$$

$\Delta Q$ is the charge at the capacitor CP. I is the current flowing through the capacitor CP. $\Delta t$ is the charging time for the capacitor CP. $C_p$ is the capacitance of CP. $\Delta V$ is the voltage difference on the capacitor CP when the capacitor CP is charged or discharged. Furthermore, $\Delta V$ is also equal to an input voltage detected in each switch switching period, as shown by the equation (2).

Then, the average current $I_{SW1,avg}(t)$ flowing through the capacitor CP when the switch SW1 is conducted may be calculated by equations (1), (2), and (3), as shown by equation (4).

$$\Delta V = V_{peak} \times |\sin\omega t| \quad (2)$$

when $$\Delta t = T1, \quad (3)$$

$$I_{SW1}(t) \sim \frac{C_P \times \Delta V}{\Delta t} = \frac{C_P}{T1} \times V_{peak} \times |\sin\omega t|$$

$$I_{SW1,avg}(t) = I_{SW1}(t) \times \frac{T1}{T_{SW}} = \frac{C_P}{T_{SW}} \times V_{peak} \times |\sin\omega t| \quad (4)$$

$V_{peak}$ is the peak voltage of the power source input signal VIN. T1 is the conduction time for the switch SW1. $I_{SW1}(t)$ is the current flowing through the capacitor CP when the switch SW1 is conducted. $C_p$ is the capacitance of CP. $T_{SW}$ is the switching period of the switch SW1.

The equivalent resistance of the voltage conversion module 160 can be deduced from the equation (4), as shown in equation (5):

$$R_{eq} = \frac{T_{SW}}{C_P} = \frac{1}{C_P \times F_{SW}} \quad (5)$$

$F_{SW}$ is the switching frequency of the switch SW1.

Figure 5:
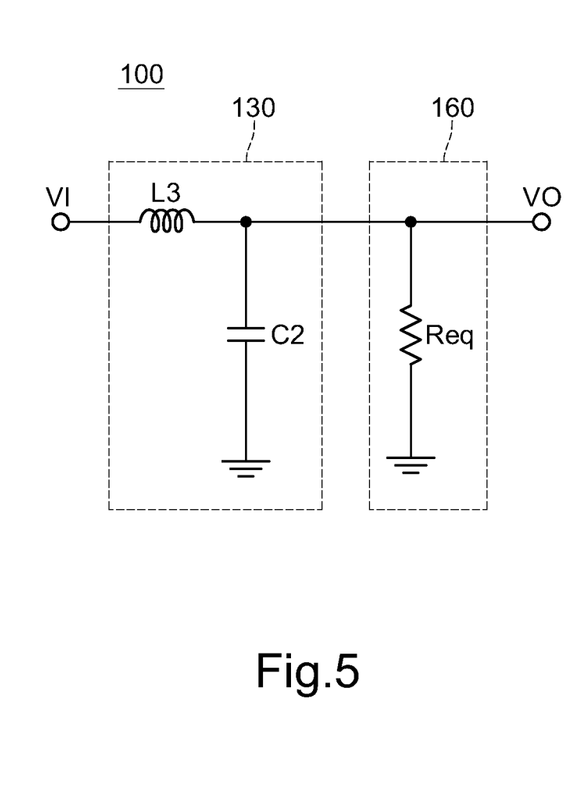
FIG. 5 is a diagram showing a part of a load driving circuit according to one embodiment of the present disclosure.

The voltage conversion module 160 may be regarded as a resistance $R_{eq}$ while the EMI filter 130 includes an inductor L3 and a capacitor C2. The connectional relationship of these elements could be referred to in FIG. 5 and will not be described herein again. According to FIG. 5, the transfer function for the load driving circuit 100 can be shown by the equation (6).

$$H(s) = \frac{VO}{VI} = \frac{S\left(\frac{R_{eq}}{L}\right)}{S^2 + S\left(\frac{R_{eq}}{L}\right) + \frac{1}{LC}} \quad (6)$$

$$\omega_0 = \frac{1}{\sqrt{LC}},$$

which is the resonance angular frequency. L is the inductance value of L3 in the EMI filter 130. C is the capacitance of the capacitor C2 in the EMI filter 130. $R_{eq}$ is the equivalent resistance of the voltage conversion module 160. The quality factor of the load driving circuit 100 can be calculated by the equation (7):

$$Q = \omega_0 \frac{L}{R_{eq}} = \sqrt{\frac{L}{CR_{eq}^2}} = \frac{1}{R_{eq}}\sqrt{\frac{L}{C}} \quad (7)$$

If Q=0.5, L=6.8 mH, C=47 nF, the equivalent resistance can be obtained by the equation (7). In short, $$R_{eq} = 2\sqrt{\frac{6.8 \times 10^{-3}}{47 \times 10^{-9}}} = 760 \, \Omega \circ$$

Accordingly, in order for the voltage conversion module 160 to operate in the damper mode, the equivalent resistance $R_{eq}$ should be adjusted to be equal to 760Ω. If the capacitance of $C_p$ is 10 nF, the switching frequency for the voltage conversion module 160 can be obtained by having $R_{eq}$=760Ω incorporated into the equation (5). As such, the switching frequency may be equal to $$\frac{1}{R_{eq} \times C_p} = 131.6 \text{ KHz.}$$

In silicon-controlled power dimmer application, when the control module 150 detects that the voltage level of the power source input signal VIN is greater than zero, a control signal CS1 may control the switching frequency to be 131.6 KHz. In this way, the voltage conversion module 160 may operate in the damper mode, and the quality factor Q=0.5 is achieved. The vibration associated with the power source input signal VIN may be therefore reduced.

In addition, if the holding current of the TRIAC 110 is 20 mA, the minimum conduction angle for the TRIAC is 10 degrees, and the input voltage VIN is 27V, then the equivalent resistance $R_{eq}$ of the voltage conversion module 160 can be calculated, which is $$\frac{VIN}{I_{TRIAC}} = \frac{27}{20m} = 1350 \, \Omega.$$

If the capacitance $C_p$ of the capacitor CP is 10 nF, the switching frequency required by the voltage conversion module 160 can be obtained by having $R_{eq}=1350\Omega$ into the equation (5). Thereafter, $$F_{sw} = \frac{1}{R_{eq} \times C_p} = \frac{1}{1350 \times 10n} = 74.1 \text{ KHz}.$$

When the control module 150 detects that the voltage level or the current level of the power source input signal VIN is lower than the default value, a control signal CS2 may control the switching frequency to be 74.1 KHz, so that the voltage conversion module 160 may operate in the bleeder mode.

Meanwhile, in order to provide a sufficient amount of the current to subsequent loads (for example, lighting module) from the voltage conversion module 160 the equivalent resistance of the voltage conversion module 160 becomes critical. If the light module has seven light emitting diodes and the current is 200 mA, then the voltage of output signal VO from the voltage conversion module 160 should be 21V and the power of the output signal VO should be 4.2 W.

However, the transfer efficiency of the voltage conversion module 160 may not be completely 100%. If the transfer efficiency is 90%, then the average power of the power source input signal VIN $P_{in\_avg}$=4.67 W, the voltage of the AC input peak voltage signal is 110V, and the voltage root-mean-square $V_{rms}$ of the power source input signal VIN is 77.78V, i.e., $V_{rms}$=77.78V. Therefore, the current root-mean-square $I_{rms}$ of the power source input signal VIN is 0.06 A $$\left( I_{rms} = \frac{P_{in\_avg}}{V_{rms}} = 0.06 \right).$$

Based on the calculated $I_{rms}$ the equivalent resistance of the voltage conversion module 160 can be obtained, i.e., $$R_{eq} = \frac{V_{rms}}{I_{rms}} = 1.3 \text{ K}\Omega.$$

If the capacitance $C_p$ of CP is 10 nF, the switching frequency required by the voltage conversion module 160 can be obtained by bringing $R_{eq}$=1.3K$\Omega$ into the equation (5). That is, $$F_{sw} = \frac{1}{R_{eq} \times C_p} = \frac{1}{1300 \times 10n} = 74.1 \text{ KHz}.$$

Accordingly, if the control module 150 detects that the voltage level or the current level of the power source input signal VIN is larger than the default value the control signal CS2 may control the switching frequency to be 74.1 KHz, so that the voltage conversion module 160 may operate in the converter mode.

The voltage conversion module 160 in this embodiment is not limited to the power factor correction resonance converter. The following will describe another example.

Figure 6:
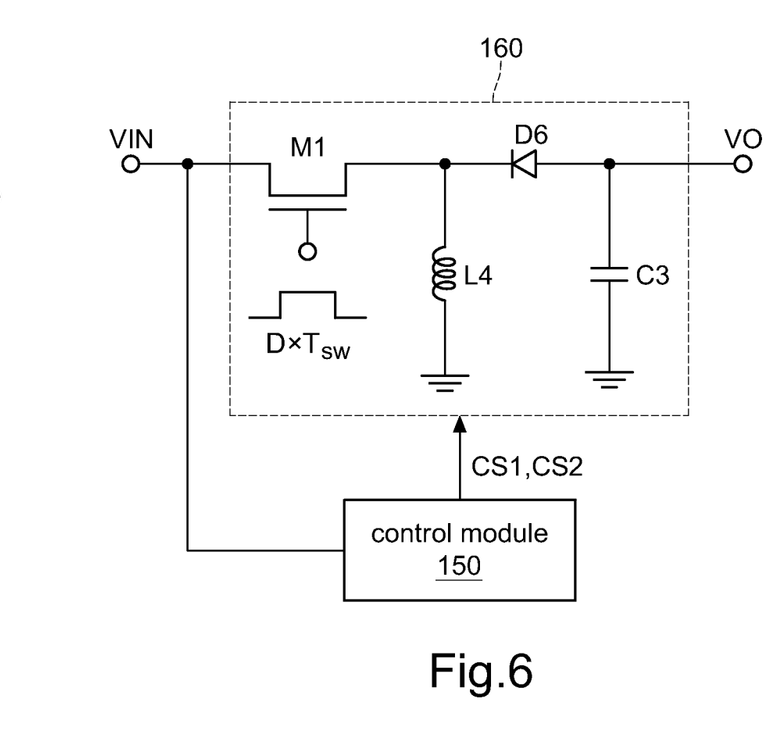
FIG. 6 is a diagram of a buck-boost converter according to one embodiment of the present disclosure.

The voltage conversion module 160 may be a buck-boost converter as shown in FIG. 6. The buck-boost converter 160 includes a transistor M1, an inductor L4, a capacitor C3, and a diode D6. The connectional relationship of these elements is shown in FIG. 6 and thus will not be described herein again. According to FIG. 6, the average current flowing through the inductor L4 can be calculated by the equation (8).

$$IL_{avg} = \frac{\frac{VIN}{L} \times DT_{sw} \times DT_{sw}}{T_{sw}} \quad (8)$$

$IL_{avg}$ is the average current flowing through the inductor L4. VIN is the voltage of the power source input signal. L is the inductance value of L4. D is the switching duty ratio. $T_{SW}$ is the switching period of the transistor M1. Then, the equivalent resistance of the voltage conversion module 160 can be obtained by the equation (9):

$$R_{eq} = \frac{VIN}{IL_{avg}} = \frac{VIN}{\frac{VIN}{L} \times DT_{sw} \times D} = \frac{L}{D^2 T_{sw}} \quad (9)$$

According, if the inductance value L of L4 and the switching period $T_{SW}$ are known, the control module 150 can use control signals CS1 and CS2 to adjust the equivalent resistance of the voltage conversion module 160 corresponding to the switching duty ratio D, so that the voltage conversion module 160 can operate in the damper mode, the bleeder mode, or the converter mode.

In addition, if the voltage conversion module is implemented by a buck converter, a boost converter, or a fly-back converter, the equivalent resistance of the voltage conversion module 160 can also be calculated by the method used for the buck-boost converter described above. Therefore, the voltage conversion module 160 implemented by a buck converter, a boost converter, or a fly-back converter can also operate in the damper mode, the bleeder mode, or the converter mode by adjusting the switching duty ratio D.

The apparatus 140 for controlling the equivalent resistance of the converter may play a role as a damper, a bleeder, or a converter. The vibration of the power source input signal VIN can be effectively restrained, and the additional energy consumption and circuit usage cost can be reduced.

Figure 7:
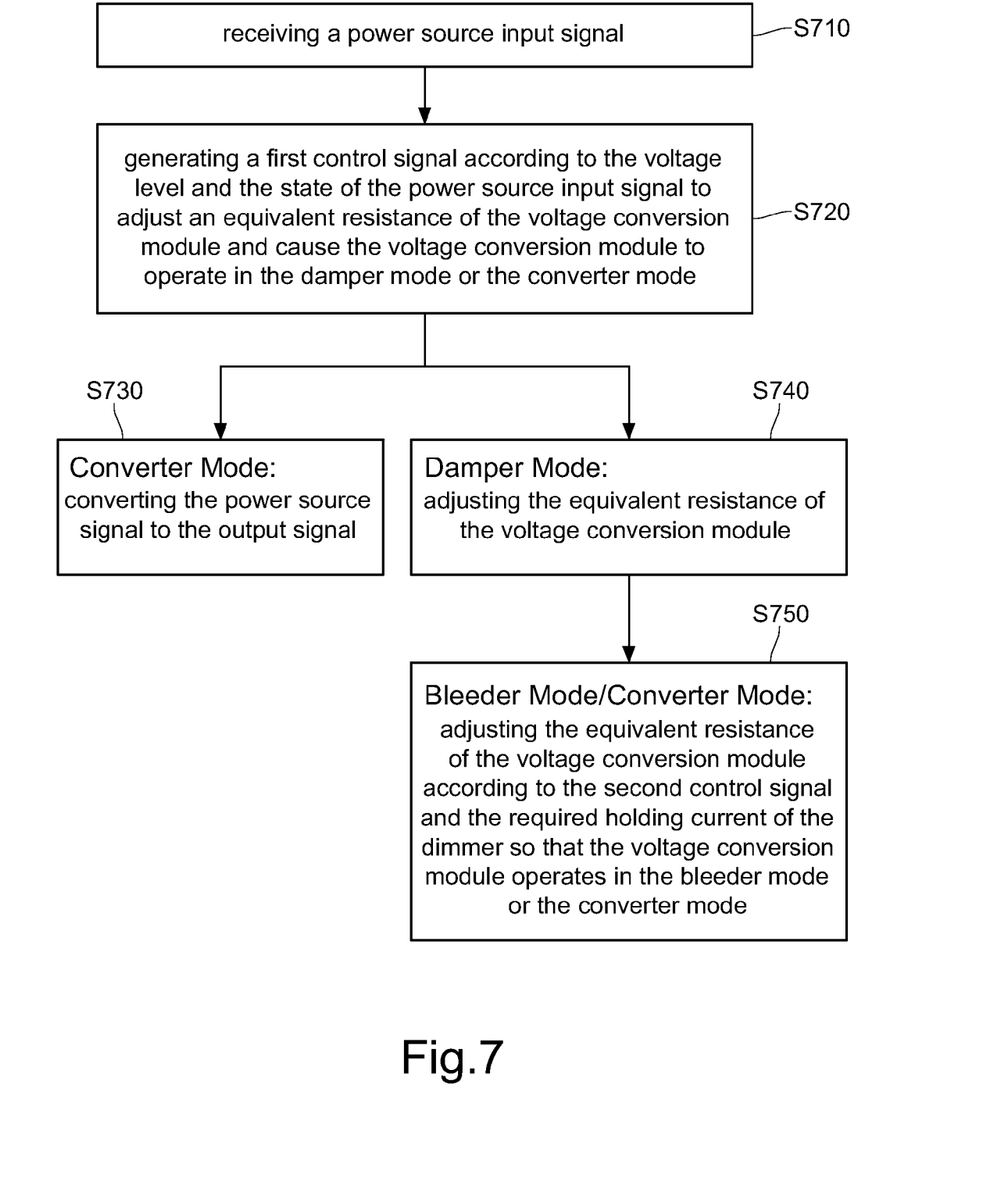
FIG. 7 is a flowchart for a method for controlling an equivalent resistance of a converter according to one embodiment of the present disclosure.

Based on the above, a method for controlling the equivalent resistance of a converter can be further introduced in FIG. 7 where a flowchart of such method is illustrated. The method can be used in the apparatus for controlling the equivalent resistance of a converter, and the apparatus includes the voltage conversion module. In the step S710, a power source input signal is received. In the step S720, a first control signal is generated according to the voltage level and the state of the power source input signal so as to adjust the equivalent resistance of the voltage conversion module and cause the voltage conversion module to operate in the damper mode or the converter mode. In the step S730, when the voltage conversion module operates in the converter mode, the power source input signal is converted to a corresponding output signal. In the step S740, the method may further include when the voltage conversion module operates in the damper mode adjusting the equivalent resistance of the voltage conversion module. In the step S750, the voltage level or the current level of the power source input signal is detected to generate a second control signal on basis of which the equivalent resistance is adjusted to provide the required holding current of the dimmer and cause the voltage conversion module operate in the bleeder mode or the converter mode.

In this embodiment, the power source input signal includes an input voltage and an input current. The output signal includes a quantitative voltage and a quantitative current. The voltage conversion module is a buck-boost converter, a power factor correction resonance converter, a buck converter, a boost converter or a fly-back converter.

Figure 8:
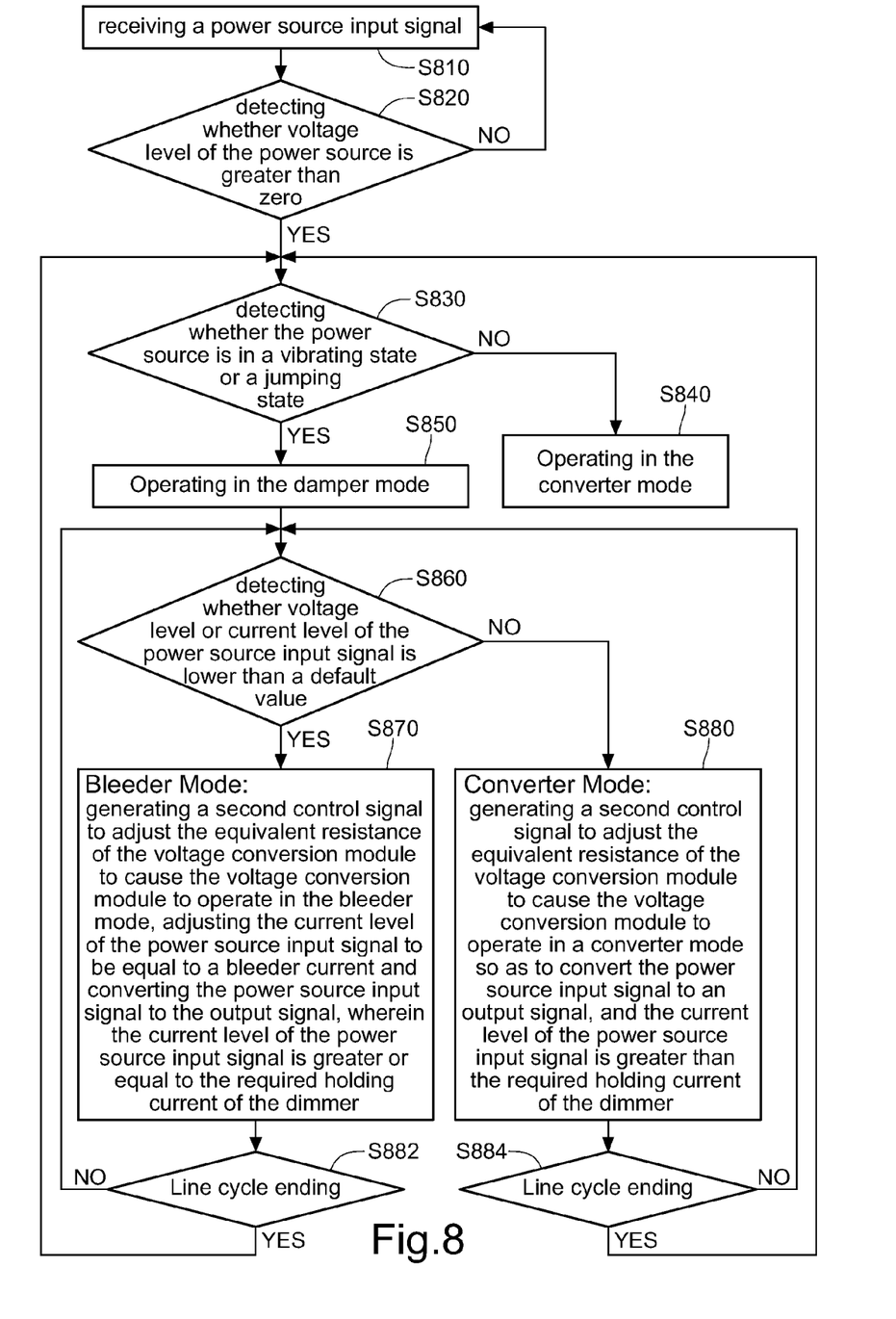
FIG. 8 is a flowchart for a method for controlling an equivalent resistance of a converter according to another embodiment of the present disclosure.

FIG. 8 is a flowchart for a method for controlling the equivalent resistance of a converter according to another embodiment of the present disclosure. The method can be used in the apparatus for controlling the equivalent resistance of a converter and the apparatus includes a voltage conversion module. In the step S810, a power source input signal is received. In the step S820, the method includes detecting whether the voltage level of the power source input signal is greater than zero.

If the voltage level of the power source input signal is not greater than zero (for example, equal to zero), the method returns to the step S810 to receive the power source input signal again. If the voltage level of the power source input signal is greater than zero, the method goes to the step S830 to detect whether the power source input signal is in the vibrating state or the jumping state.

If the power source input signal is not in the vibrating state or the jumping state, the method goes to the step S840 to generate a first control signal causing the voltage conversion module to operate in the converter mode so as to convert the power source input signal to the corresponding output signal. If the power source input signal is in the vibrating state or the jumping state, the method goes to the step S850 to generate another first control signal to adjust the equivalent resistance of the voltage conversion module and cause the voltage conversion module to operate in the damper mode.

In the step S860, the method may determine whether the voltage level or the current level of the power source input signal is lower than a default value. If the voltage level/current level is lower than the default value, the method goes to the step S870 to generate a second control signal so as to adjust the equivalent resistance of the voltage conversion module and cause the voltage conversion module operate in the bleeder mode. The current of the power source input signal is adjusted to be a bleeder current, and the power source input signal is converted to an output signal. The current of the power source input signal is greater than the holding current of the TRIAC.

After the step S870, the method returns to the step S830 at the beginning of each power source period to detect again whether the power source input signal is in either the vibrating state or the jumping state for subsequent conversion operations on the power source input signal.

If it is detected that the voltage level or the current level of the power source input signal is greater than the default value, the method goes to the step S880 to generate another second control signal so as to adjust the equivalent resistance of the voltage conversion module and cause the voltage conversion module to operate in the converter mode. The power source input signal is converted to an output signal, and the current of the power source input signal is greater than the holding current of the TRIAC. After both the steps S870 and S880, the method goes to the determination of whether line cycle ends (step S882 and S884, respectively). When the line cycle ends, the method returns to the step S830 at the beginning of each power source period to detect again whether the power source input signal is in the vibrating or the jumping state for subsequent conversion operations on the power source input signal. Otherwise, the method returns to the step S860.

In this embodiment, the power source input signal includes an input voltage and an input current. The output signal includes a quantitative voltage and a quantitative current. The voltage conversion module is a buck-boost converter, a power factor correction resonance converter, a buck converter, a boost converter, or a fly-back converter.

The method and apparatus for controlling the equivalent resistance of a converter adjust the equivalent resistance of the voltage conversion module by detecting the voltage or current level and state of the power source input signal, and thus the voltage conversion module is controlled to be operating in the damper mode, the bleeder mode, or the converter mode. In this way, the voltage conversion module can function as a damper, bleeder, or converter, eliminating the necessity of the installation of other dampers and bleeders. Therefore, the energy consumption and the manufacturing cost of the entire circuitry can be effectively reduced.

What is claimed is:

1. A method for controlling an equivalent resistance of a converter, wherein the method is adapted to an apparatus for controlling the equivalent resistance of the converter, and the apparatus includes a voltage conversion module, the method comprising:

receiving a power source input signal;

generating a first control signal according to a voltage level and a state of the power source input signal to adjust an equivalent resistance of the voltage conversion module and cause the voltage conversion module to operate in a damper mode or a converter mode;

converting the power source input signal to an output signal when the voltage conversion module operates in the converter mode;

adjusting the equivalent resistance of the voltage conversion module to provide a required damper resistance when the voltage conversion module operates in the damper mode;

detecting the voltage level or a current level of the power source input signal to generate a second control signal, and adjusting the equivalent resistance to provide a required holding current for a dimmer and cause the voltage conversion module to operate in a bleeder mode or the converter mode to convert the power source input signal to the output signal, after the voltage conversion module finishes operating in the damper mode; and adjusting the equivalent resistance of the voltage conversion module so that the current level is greater the required holding current of the dimmer when the voltage conversion module operates in the bleeder mode.

2. The method according to claim 1, wherein the step of generating the first control signal according to the voltage level and the state of the power source input signal to adjust the equivalent resistance of the voltage conversion module and cause the voltage conversion module to operate in the damper mode or the converter mode further comprises:

detecting whether the voltage level of the power source input signal is greater than zero;

if the voltage level of the power source input signal is not greater than zero returning to detecting whether the voltage level of the power source input signal is greater than zero;

if the voltage level of the power source input signal is greater than zero detecting whether the power source input signal is in a vibrating state or a jumping state;

if the power source input signal is not in the vibrating state or the jumping state, generating the first control signal to control the voltage conversion module to operate in the converter mode; and if the power source input signal is in the vibrating state or the jumping state, generating the first control signal to adjust the equivalent resistance of the voltage conversion module and cause the voltage conversion module to operate in the damper mode.

3. The method according to claim 2, wherein detecting the voltage level or the current level of the power source input signal to generate the second control signal, and adjusting the equivalent resistance of the voltage conversion module to cause the voltage conversion module to operates in the bleeder mode or the converter mode to convert the power source input signal to the output signal further comprises:

detecting the voltage level or the current level of the power source input signal is lower than a predetermined default value;

if the voltage level or the current level of the power source input signal is lower than the default value, generating the second control signal to adjust the equivalent resistance of the voltage conversion module and cause the voltage conversion module to operate in the bleeder mode, and adjusting the current level of the power source input signal to be equal to a bleeder current and converting the power source input signal to the output signal, wherein the current level of the power source input signal is greater than or equal to the required holding current of the dimmer; and if the voltage level or the current level of the power source input signal is greater than the default value, generating the second control signal to adjust the equivalent resistance of the voltage conversion module and cause the voltage conversion module to operate in the converter mode, and converting the power source input signal to the output signal, wherein the current level of the power source input signal is greater than the required holding current of the dimmer.

4. The method according to claim 1, wherein the power source input signal includes an input voltage and an input current.

5. The method according to claim 1, wherein the output signal includes a quantitative voltage and a quantitative current.

6. The method according to claim 1, wherein the voltage conversion module is a buck-boost converter, a power factor correction resonance converter, a buck converter, a boost converter or a fly-back converter.

7. An apparatus for controlling an equivalent resistance of a converter, comprising:

a control module for receiving a power source input signal, generating a first control signal according to a voltage level and a state of the power source input signal, and generating a second control signal according to the voltage level or a current level of the power source input signal; and a voltage conversion module connected to the control module for adjusting an equivalent resistance of the voltage conversion module according to the first control signal to cause the voltage conversion module to operate in a damper mode or a converter mode, and when the voltage conversion module operates in the converter mode, the voltage conversion module is used to convert the power source input signal to an output signal, and when the voltage conversion module operates in the damper mode, subsequent to the voltage conversion module operating in the damper mode, the voltage conversion module is used to adjust the equivalent resistance of the voltage conversion module according to the second control signal and a required holding current of dimmer so that the voltage conversion module operates in a bleeder mode or the converter mode and the power source input signal is converted to the output signal.

8. The apparatus according to claim 7, wherein the control module is used to detect whether the voltage level of the power source input signal is greater than zero, if the power source input signal is not greater than zero, the control module continues to detect whether the voltage level of the power source input signal is greater than zero, if the voltage level of the power source input signal is greater than zero, the control module detects whether the power source input signal is in a vibrating state or a jumping state, if the power source input signal is not in the vibrating state or the jumping state, the control module generates the first control signal to cause the voltage conversion module to operate in the converter mode, and if the power source input signal is in the vibrating state or the jumping state, the control module generates another first control signal to control the voltage conversion module to adjust the equivalent resistance of the voltage conversion module and cause the voltage conversion module to operate in the damper mode.

9. The apparatus according to claim 8, wherein the control module is used to whether the voltage level or the current level of the power source input signal is lower than a predetermined default value, if the voltage level or the current level of the power source input signal is lower than the predetermined default value, the control module generates the second control signal to adjust the equivalent resistance of the voltage conversion module and cause the voltage conversion module to operate in the bleeder mode, and the current level of the power source input signal is adjusted to be equal to a bleeder current and the power source input signal is converted to the output signal, wherein the current level of the power source input signal is greater than or equal to a required holding current of a dimmer, if the voltage level or the current level is higher than the default value, the control module generates another second control signal to adjust the equivalent resistance of the voltage conversion module and cause the voltage conversion module to operate in the converter mode, so that the power source input signal is converted to the output signal and the current level of the power source input signal is greater than the holding current of the dimmer.

10. The apparatus according to claim 7, wherein the power source input signal includes an input voltage and an input current.

11. The apparatus according to claim 7, wherein the output signal includes a quantitative voltage and a quantitative current.

12. The apparatus according to claim 7, wherein the voltage conversion module is a buck-boost converter, a power factor correction resonance converter, a buck converter, a boost converter, or a fly-back converter.

* * * * *